Figure 4:
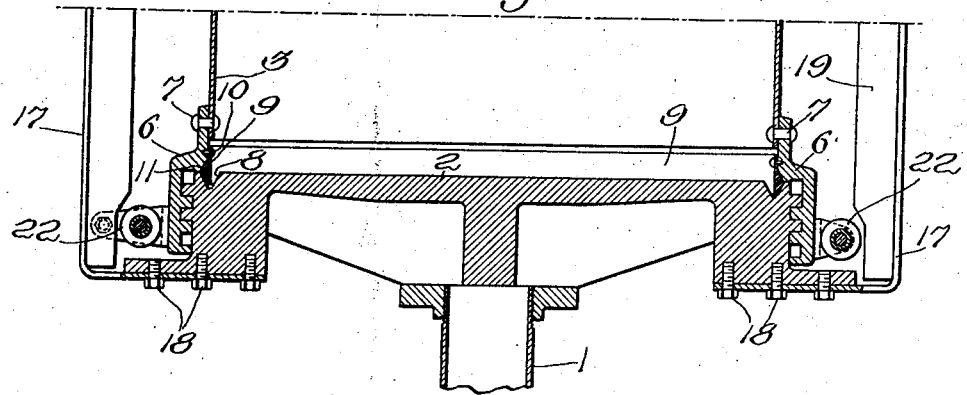

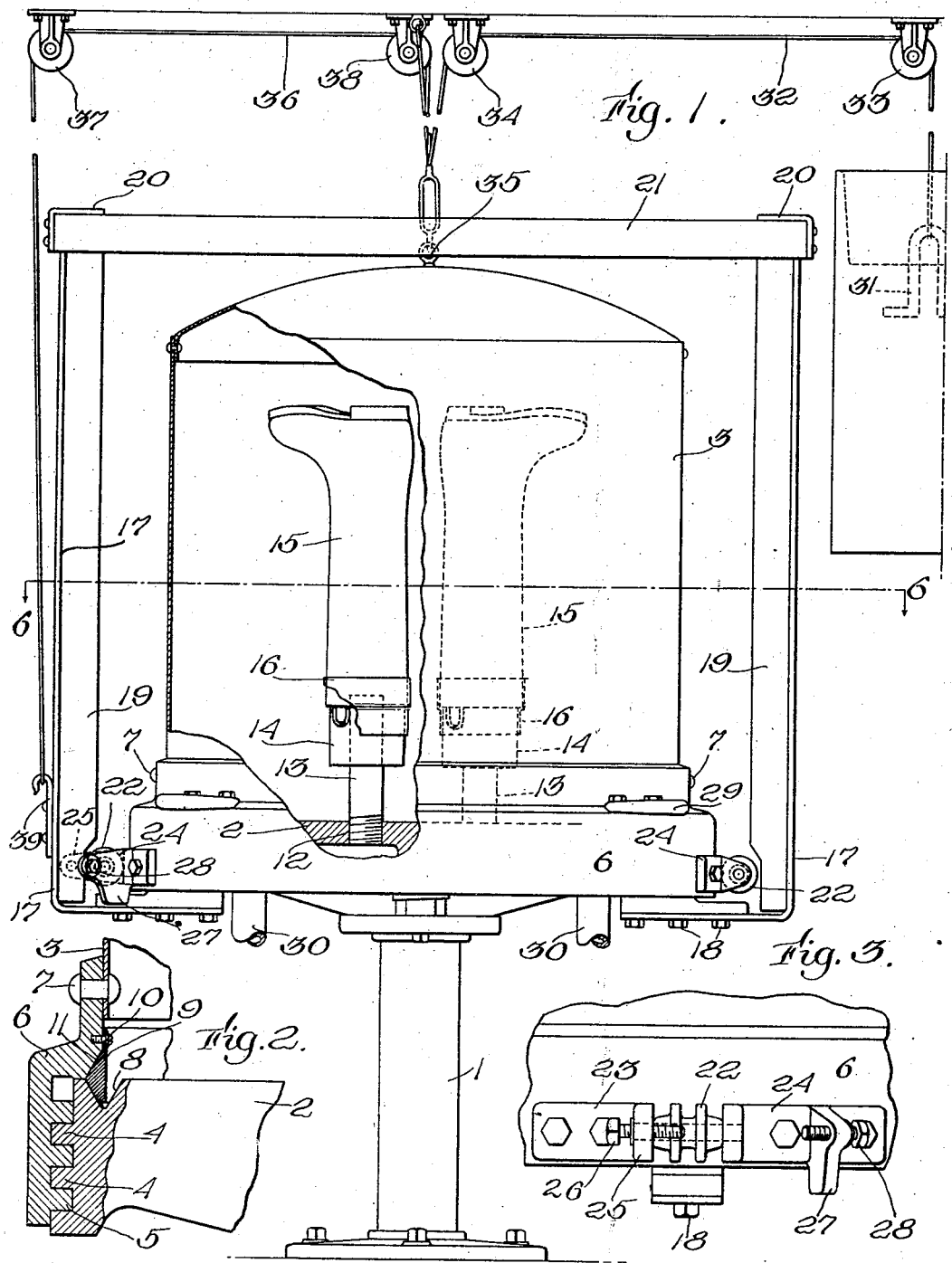

C. J. RANDALL.
PRESSURE APPLYING APPARATUS FOR RUBBER FOOTWEAR.
APPLICATION FILED AUG. 23, 1913.

1,158,390.

Patented Oct. 26, 1915.

3 SHEETS—SHEET 2.

Witnesses
Edward Maxwell
James R. Hodder

Inventor:
Chester J. Randall,
by Geo. H. Maxwell,
Attorney

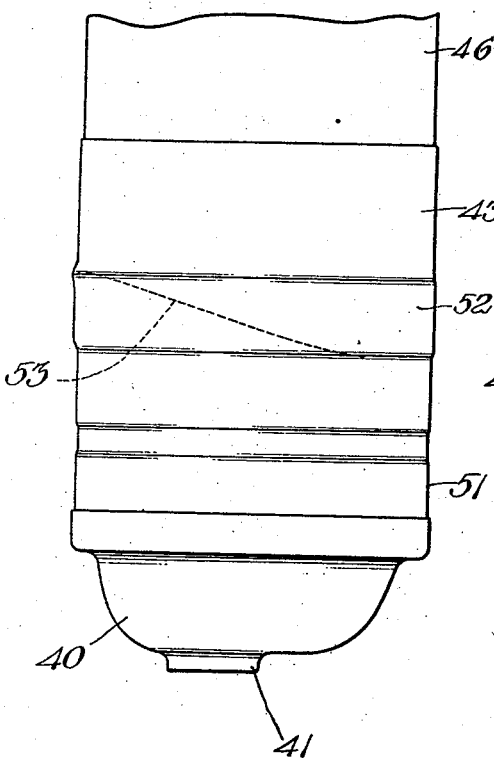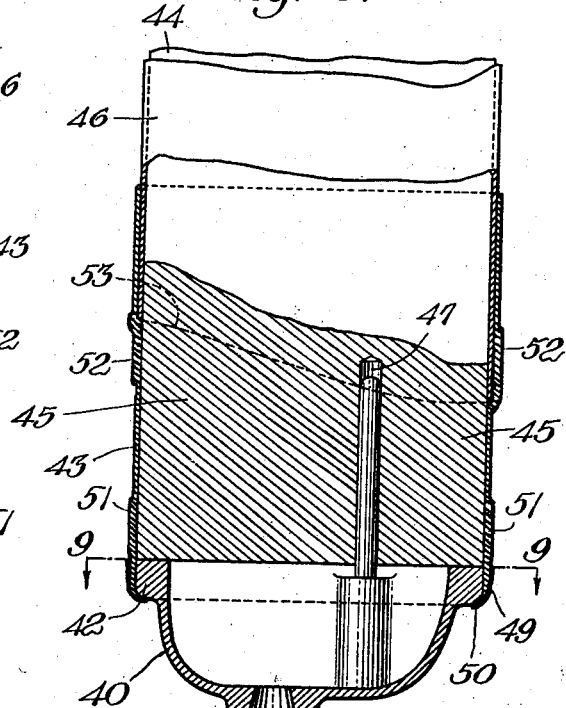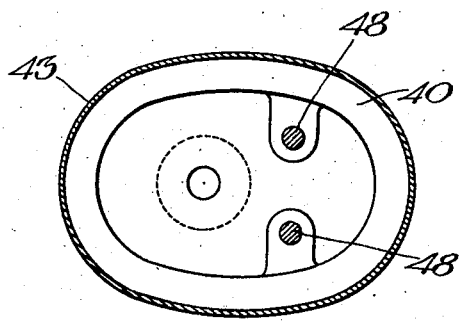

UNITED STATES PATENT OFFICE.

CHESTER J. RANDALL, OF WALTHAM, MASSACHUSETTS, ASSIGNOR TO BOSTON RUBBER SHOE COMPANY, A CORPORATION OF MASSACHUSETTS.

PRESSURE-APPLYING APPARATUS FOR RUBBER FOOTWEAR.

1,158,390.  Specification of Letters Patent.  Patented Oct. 26, 1915.

Application filed August 23, 1913. Serial No. 786,318.

*To all whom it may concern:*

Be it known that I, CHESTER J. RANDALL, a citizen of the United States, and resident of Waltham, county of Middlesex, State of Massachusetts, have invented an Improvement in Pressure-Applying Apparatus for Rubber Footwear, of which the following description, in connection with the accompanying drawings, is a specification, like letters on the drawings representing like parts.

This invention relates to pressure applying apparatus for use in the manufacture of rubber footwear.

The apparatus of my present invention is designed primarily for carrying out, upon rubber boots, the process described in the copending application of W. E. Piper, Serial No. 755,416. An apparatus for carrying out said process upon rubber footwear of the ordinary type, such as rubber shoes, over-shoes, etc., is described and claimed in the copending application, Serial No. 755,414, but my present invention is primarily applicable to rubber boots, having a considerable length of upper stock. The advantages incident to the pressure applying process upon such articles, prior to vulcanization, have been fully described in the applications above noted, and it is to secure the same advantages upon rubber boots and the like that I have devised the present apparatus.

My apparatus comprises a pressure receiving drum, adapted to be positioned over a plurality of boots while the same are mounted upon their respective lasts or trees, and then to subject the same to the application of pressure on the exterior layer or surface of the shoe, compressing, smoothing, and compacting the materials comprising the boot, firmly upon the last supporting it.

In order to secure the fullest advantages incident to such application of pressure, it is necessary to provide means for the escape of the air within the layers of the boot, and between the boot materials and the last, so as to afford the proper differential pressure from the outer surface of the boot material to the last. To this end I first prepare the lasted boot by affixing a seal of rubber or other suitable like elastic material between the top of the boot and the wood of the last on which it is supported, and preferably also provide a pipe from within said boot tree and seal to the open air, so that when pressure is applied to the outer surface of the shoe materials, the air contained within may escape.

Other features of the invention, novel combinations of parts, and details of construction, will be hereinafter more fully pointed out and claimed.

Figure 5:
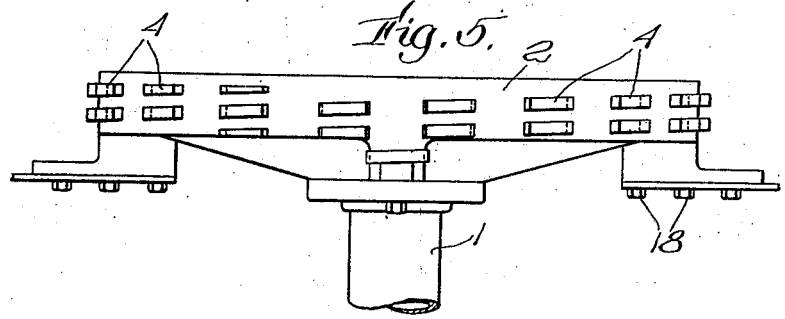
Figure 6:
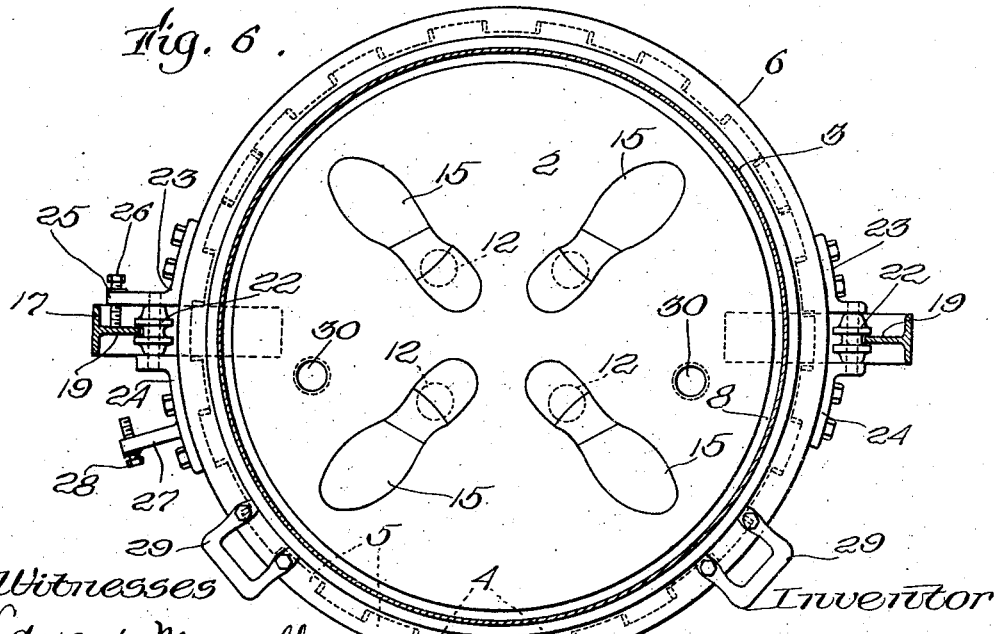

Referring to the drawings, wherein a preferred embodiment of the invention is illustrated, Figure 1 is a view, partly in section, of my pressure-applying apparatus, showing the removable drum, its coöperating base, and a rubber boot in position to be operated upon; Fig. 2 is an enlarged detail, partly in section, of the means for joining the drum and base; Fig. 3 is an enlarged view of a portion of the drum; Fig. 4 is a view in cross section of the base and part of the drum; Fig. 5 is a side view of the base; Fig. 6 is a plan view on the line 6—6 of Fig. 1; and Figs. 7, 8, and 9 are enlarged views, showing a modified form of the sealing device and cap which may be employed.

In carrying out my invention in preferred form, as herein shown, I preferably arrange the apparatus for operation upon a plurality of pairs of boots; while only two such pairs are illustrated, it is of course, within the purview of the invention to arrange for a still larger number of pairs to be operated upon simultaneously, or for a lesser number as well. On a suitable standard 1 is provided a base 2 on which a removable drum or bell-shaped member 3 is adapted to coöperate, so as to constitute a pressure receiving receptacle in which the boots to be treated are placed. The base 2 is provided with a plurality of interrupted locking lugs 4 in the form of screw threads and designed to coöperate with correspondingly interrupted and coöperating members 5, carried by an annular flange 6 bolted to the base of the bell 3 by suitable bolts 7, so that when the bell is lowered upon the base 2 and given a partial rotative turn, the coöperating members 5 and 4 will interlock and secure a wedging action in well known manner. The base 2 is provided with an annular groove or recess 8, preferably of V-shaped form and the flange 6 carries an annular gasket 9, secured by screws 10 (see Fig. 2) in position to fit into the recess 8 as the bell 3 is lowered on the base, and to secure a substantially airtight joint between the base 2 and bell 3. To facilitate this airtight construction, I prefer to form the inner edge of the flange 6 on which the gasket 9 is carried, at a bevel, as indicated at 11, to coöperate with the corresponding wedge or beveled outer portion of the groove 8, as shown, so that as pressure is applied to the inside of the bell 3 the gasket 9 will be forcibly wedged against the respective beveled portions of the flange 6 and base 2, as just explained.

The base 2 is provided at a plurality of points with threaded apertures 12, each adapted to receive a correspondingly threaded pipe 13, which pipe in one form of the invention penetrates a block 14 to which the last carrying the rubber boot 15 to be operated upon is adjusted, in any suitable manner. The block 14 is of suitable size and form to substantially fit the top of the boot, or the last on which the boot is made may extend and be fitted with the pipe 13. In either case, a seal 16 of rubber or other suitable material is applied, covering the extreme upper portion of the rubber boot 15 and the block 14, or the seal 16 may extend directly from the rubber of the boot to and around the pipe 13.

It will be understood that the wooden last on which the shoe 15 is carried, is in sections, affording air passage throughout the extent of its interior, and the pipe 13 is in open communication with said air passage, either by extending it through the block 14 or into the top of the last, as above explained.

In order to control the bell 3 in a convenient manner, I have provided a framework 17 at diametrically opposite points of the apparatus, which may be secured to the base 2 by screws 18 and which frame carries on its inner side tracks 19. Preferably the frame 17 is in the form of an angle iron to carry the tracks 19 as an integral portion thereof throughout the height, to constitute a guide for the bell 3 when it is released from the base 2 for the purpose of removing or positioning the boots to be operated upon, or which have been operated upon. Cross pieces 20 and 21 are secured to the top portions of the framework 17 with a spread sufficient to permit the bell 3 to be lifted between the same.

The flange 6 has grooved rollers 22 mounted at diametrically opposite points to coöperate with the tracks 19 in steadying the bell 3, as it is raised and lowered, and in insuring that it will be in proper position so that the coöperating locking devices 4 and 5 will not register as the bell is lowered. These rollers 22 are mounted between L-shaped brackets 23 and 24 respectively, with the pivot or axle for said rollers carried by the vertically extending portion of the brackets, as clearly shown in Figs. 3 and 6. In order to limit the rotative movement of the bell 3, one of the brackets 23 has its outward extending portion elongated as indicated at 25 to carry an adjusting screw 26 in position to contact with the side of the track 19. The corresponding other bracket 24 is provided with a similarly extending lug or arm 27 carrying an adjusting screw 28 in its outer end, also in position to contact with the opposite side of the same track 19. This construction facilitates the positioning of the bell 3 and base 2 so that during the partial rotation of the bell 3 to engage and lock the coöperating threads 4 and 5, as well as for the reverse movement to unlock the same so that the bell may be lifted, the adjustable stops 26 and 28 determine the correct relative movement of the bell as will be readily understood. The bell 3 or flange 6 is also provided with handles 29 to aid in the rotative movement just mentioned.

The base 2 is provided with one or more inlet pipes 30 connected with any suitable source of pressure supply, and extending through the base 2, as indicated in Fig. 6. In order to aid in the operation of lifting and lowering the bell 3, I preferably arrange a counterweight 31 which may be connected through a rope 32 extending over pulleys 33 and 34 secured to the roof beams, or other suitable support, and connected with an eye-bolt 35 in the top of the bell 3. A second rope 36 secured to the same eye-bolt and extending over pulleys 37 and 38 and downwardly to within convenient reach of the operator, is also provided so that the bell 3 may be lifted and lowered. With the counterweight 31 substantially equaling the weight of the bell 3, this raising operation is easily accomplished by one man, a hook 39 secured to the side of the frame 17 serving as a catch for the rope 6 to hold the bell when raised.

In Figs. 7, 8, and 9 I have shown in detailed form a modified construction of a cap and rubber sealing device which may be used to facilitate the positioning of the rubber boot in the apparatus and to seal the top of the same quickly in a substantially airtight manner. I prefer to use this modified construction, as an operator can place and seal the boots to be operated upon and remove the same much more quickly and effectively than in the form of sealing apparatus described above. As shown in Fig. 7, I use a metal cap 40 provided with a tubular boss 41 having a tapered ground joint to fit upon the stem 13 which may be permanently left screwed into the socket 12 in the base 2, this cap being preferably formed hollow and having a flange 42 formed around the upper rim thereof which is adapted to contact directly with the top of a wooden boot tree carrying the boot or shoe to be affixed in the apparatus. Preferably the contour of the flange 40 is substantially similar to that of the top of the boot tree applied thereto, although slight inequalities in form will be automatically taken care of by the rubber seal 43. I have illustrated a portion of a wooden boot tree 44, of sufficient length to have its top 45 projecting beyond the rubber shoe 46 thereon. In the top 45 of the tree are bored sockets, one being indicated at 47 and the cap 40 is provided with pins 48 to fit in said sockets, as will be readily understood on reference to Figs. 8 and 9. The rubber seal 43 is adapted to fit around the exterior of the flange 42 and to be drawn over the wooden portion of the boot tree and the top portion of the rubber shoe upper, so that it fits the same tightly and affords a substantially airtight seal from the cap 40 to the exterior of the rubber boot upper.

Preferably the rubber seal 43 is provided with a reinforcing band 49 of extra rubber, canvas, or the like, with its lower portion curved slightly to fit around the flange 42 as indicated at 50, so that as the seal 43 is drawn over the boot tree, it will hug the flange 42 tightly and not be pulled thereover. This seal 43 may be left permanently upon the cap 40 and simply slid or drawn off of a boot upper and last to facilitate removal of the same after the pressure applying apparatus. Fig. 9 shows in cross section on the lines 9—9 of Fig. 8 the seal 43 and cap 40 before the same is applied to a rubber shoe. In order to increase the sealing action of the member 43, I prefer to provide same with a plurality of reinforcing bands as shown at 51 and 52, the upper band 52 being in appropriate position to cover the rim 53 as indicated in dotted lines of the top edge of the rubber boot, this feature affording a more substantially air tight construction and greater grasping hold on the upper and last than if the seal 43 were of uniform thickness and elasticity. It will be seen that the elasticity of the seal 43 will automatically take care of the slight inequalities in form or size of the rim 42, and the top of the wooden boot tree so that a considerable range of different boot trees may be utilized on the same cap 40, although I prefer to have the rim 42 of such caps of substantially equal contour with the tops of the trees on which they are to be used. The caps 40 may be applied to the boot trees and then set on to the taper tops of the stems 13 which are in convenient position to hold the same within the pressure drum.

In the operation of my apparatus, the bell 3 being raised in uppermost position, the operator will place a plurality of pairs of lasted boots in position on the base 2 by threading the pipes 13 of each in the respective sockets 12 provided therefor. These lasted boots will have been previously equipped with seals 16, as above explained, or with the caps 40, and seals 43. The operator then releases the rope 36 from the hook 39, allowing the bell 3 to slide downwardly, while the rollers 22 are guided on the respective tracks 19. When in lowered position, the operator then, by means of the handles 29, gives the bell 3 a partial rotative movement to lock the coöperating threaded portions 4 and 5 and wedge the bell and base 2 together, the lower portions of the tracks 19 being cut away to permit the rolls 22 to swing by during this rotative movement. The stop 28 limits such rotative movement by contacting with the side of a track 19. The operator then turns on the pressure supply through the pipes 30 until the desired pressure is secured within the bell 3, approximately 90 or 100 pounds. This pressure forces the various layers constituting the upper materials of each boot 15 firmly, solidly, and compactly against the wood of the last on which it is contained, all excess air within the outer surface of such boot materials being forced out through the inner sections of the tree or last, and out of the pipe 13 (or through the cap 40) into the open air. If the seal 16 is tight about both upper and pipe, and there is no leakage whatever in the bell, the pressure supply may be shut off when the desired amount has been reached, and the boots left under said pressure for such length of time as may be found necessary, to effectually and permanently smooth out all wrinkles in the stock, compact the various layers constituting the shoe, and provide a satisfactory completed article ready for the vulcanizing process. In case the seal is not substantially air tight, a small supply of pressure may be continuously turned on to maintain the desired pressure. It will be understood that this process of applying pressure to rubber footwear as a step in the manufacture of such articles, prior to vulcanization, takes the place of the former hand rolling operations which have heretofore been necessary, in order to smooth out the wrinkles, properly compress the various layers in the shoe, fitting the shoe to the last in preparing the article for vulcanization, as more fully explained in said prior applications. After the boots have been maintained within the pressure afforded for a suitable length of time, the pressure is released by opening a valve in the pipe or pipes 30 (not shown), and the operator reverses the rotative movement of the bell 3 until the stop 26 contacts with the side of the adjacent track 19, when the bell will be in position so that the rollers 22 will meet the tracks 19 as the bell is raised and the interrupted portions of the locking threads 4 and 5 will be in position to permit the same to pass and allow the bell to be raised, when the boots 15 are removed and the next boots to be operated upon are fitted in place.

While it is not essential that the bell 3 be absolutely air tight, I prefer to have the same substantially so, and the gasket 9 and threaded connections between the pipes 13 insures a substantially air tight construction, the internal pressure against the gasket 9 wedging the same into the coöperating beveled faces of the flange 6 and base 2.

While I have described the apparatus herein illustrated as intended primarily for use in operating upon boots, it is, of course, possible to use the same upon shoes, providing that a seal is utilized, similar to the seal 16, herein illustrated.

Having described my invention, what I claim as new and desire to secure by Letters Patent is:

1. In an apparatus of the class described, a base member, a receptacle coöperating with said base member, means supported by said base member to hold a plurality of lasted boots, and means to supply pressure within said receptacle simultaneously to the outer surfaces of the sole and upper of each boot.

2. In an apparatus of the class described, a base member, a receptacle coöperating with said base member, means supported by said base member to hold a plurality of lasted boots, and means to supply uniform pressure within said receptacle simultaneously to the outer surfaces of the sole and upper of each boot.

3. In an apparatus of the class described, means to hold a plurality of lasted boots, and means to supply pressure to the outer surfaces of the sole and upper of each boot, in combination with means permitting the air within each lasted boot to escape simultaneously with the application of said pressure.

4. An apparatus of the kind described, comprising a movable bell and a base coöperating therewith, means to lock said bell and base together in a substantially air tight manner, a support for a lasted boot within said bell having an opening from the interior of the boot to the outer air, and means to supply pressure to the outer surface of said boot.

5. An apparatus of the kind described, comprising a movable bell and a base coöperating therewith, means to lock said bell and base together, a plurality of supports for a plurality of lasted boots, and means to exert differential pressure on the outer and inner surfaces of the boot to compress same against its last.

6. An apparatus of the kind described, comprising a movable bell and a base coöperating therewith, means to lock said bell and base together consisting of coöperating segmental thread members thereon, and means to render the joint between said base and bell substantially airtight by having a compressible member carried by one part and coöperating with a groove carried by the other part.

7. An apparatus of the kind described, comprising a movable bell and a base coöperating therewith, and means to lock said bell and base together, comprising a flange on the bell having internal segmental thread members coöperating with corresponding segmental thread members on the base, whereby a relative partial revolution will effect the locking of the bell and base together.

8. In an apparatus of the kind described, a metallic cap adapted to fit the top of a boot tree to be operated upon, said cap having an outlet from its interior to the outer air, and an elastic sealing means carried by said cap and adapted to fit around boot trees of varying sizes.

9. In an apparatus of the kind described, a metallic cap having a flange adapted to fit substantially the contour of a boot tree, said cap having an outlet from its interior to the outer air, means carried by said cap to hold the cap and boot tree in relative assembled position, and means for providing a substantially air tight seal from said cap to a boot upper applied to the said boot tree.

10. In an apparatus of the kind described, a metallic cap having a plurality of pins adapted to hold a boot tree thereon, said cap having an outlet from its interior to the outer air, and means for providing a substantially air tight seal from the exterior of the cap to and around the exterior of a boot and boot tree applied thereto.

In testimony whereof, I have signed my name to this specification, in the presence of two subscribing witnesses.

CHESTER J. RANDALL.

Witnesses:
 JAMES R. HODDER,
 H. FREDERICK FOOTE.